(12) United States Patent
Pal et al.

(10) Patent No.: US 12,528,934 B2
(45) Date of Patent: Jan. 20, 2026

(54) FUNCTIONALIZED PARTICLES

(71) Applicant: Archroma (Switzerland) GmbH, Pratteln (CH)

(72) Inventors: Jit Pal, Maharashtra (IN); Vrushali Warge, Maharashtra (IN); Sachin Gokhale, Maharashtra (IN); Anuradha Misra, Gujarat (IN); Vishal Y Joshi, Gujarat (IN)

(73) Assignee: Archroma (Switzerland) GmbH, Pratteln (CH)

( * ) Notice: Subject to any disclaimer, the term of this patent is extended or adjusted under 35 U.S.C. 154(b) by 699 days.

(21) Appl. No.: 17/795,626

(22) PCT Filed: Jan. 22, 2021

(86) PCT No.: PCT/EP2021/051445
§ 371 (c)(1),
(2) Date: Jul. 27, 2022

(87) PCT Pub. No.: WO2021/151788
PCT Pub. Date: Aug. 5, 2021

(65) Prior Publication Data
US 2023/0090216 A1    Mar. 23, 2023

(30) Foreign Application Priority Data
Jan. 29, 2020   (IN) .............................. 202011003976

(51) Int. Cl.
*C08L 1/02*     (2006.01)
*C08G 77/14*    (2006.01)

(52) U.S. Cl.
CPC ................ *C08L 1/02* (2013.01); *C08G 77/14* (2013.01)

(58) Field of Classification Search
CPC ........ C08L 1/02; C08G 77/14; D06M 15/643; D06M 15/647; D06M 15/658; D06M 23/12; D06M 2200/50; D06M 2400/01
See application file for complete search history.

(56) References Cited

U.S. PATENT DOCUMENTS

| | | | |
|---|---|---|---|
| 4,341,699 A | 7/1982 | Tezuka et al. | |
| 4,937,167 A | 6/1990 | Moffat et al. | |
| 5,283,153 A | 2/1994 | Sacripante et al. | |
| 5,302,486 A | 4/1994 | Patel et al. | |
| 6,086,636 A | 7/2000 | Mheidle et al. | |
| 6,897,168 B2 | 5/2005 | Branham et al. | |
| 6,949,167 B2 | 9/2005 | Shannon et al. | |
| 7,087,564 B2 | 8/2006 | Mishra et al. | |
| 8,029,646 B2 | 10/2011 | Moncla et al. | |
| 8,546,509 B2 | 10/2013 | Kulke et al. | |
| 10,550,280 B2 | 2/2020 | Katayama et al. | |
| 2003/0013369 A1* | 1/2003 | Soane ................... | D06M 23/12 442/181 |
| 2009/0155195 A1* | 6/2009 | Grey ..................... | D06M 23/12 424/59 |
| 2016/0258091 A1* | 9/2016 | Bauers ................... | D04H 1/587 |
| 2017/0114243 A1 | 4/2017 | Katayama et al. | |

FOREIGN PATENT DOCUMENTS

| | | |
|---|---|---|
| CN | 1669629 A | 9/2005 |
| CN | 106397675 A | 2/2017 |
| CN | 106397675 | 2/2019 |
| CN | 109647297 A | 4/2019 |
| GB | 1576237 | 10/1980 |
| KR | 20070049154 A | 5/2007 |
| TW | 2007-45411 A | 12/2007 |

OTHER PUBLICATIONS

Jang et al, Effects of Silicone Softeners and Silane Coupling Agents on the Performance Properties of Cotton Fabrics, 1993, Textile Research Journal, vol. 63, Issue 10, p. 557-565 (Year: 1993).*
Search Report from corresponding Taiwanese Patent Application No. 110102824 dated Sep. 11, 2024.
Sheng Xinxin et al.; Synthesis and Characterization of Core/Shell Titanium Dioxide Nanoparticle/Polyacrylate Nanocomposite Colloidal Microspheres; Abstract. (2016).
Preparation of a Noval Magnetic Microporous Adsorbent and its adsorption Behavior of p-nitrophenol and Chlorotetracycline; Abstract. (Feb. 15, 2014).
First Office Action, Korean Intellectual Property Office, Application No. 10-2022-7029906, Dated Sep. 1, 2025. 10 pages.

* cited by examiner

*Primary Examiner* — Mark Eashoo
*Assistant Examiner* — Caitlin Norine Illing
(74) *Attorney, Agent, or Firm* — Christensen, Fonder, Dardi & Herbert PLLC; Elizabeth A. Gallo

(57) ABSTRACT

Functionalized particles comprising a shell and a core and a payload that is embedded or entrapped, wherein the shell matrix is obtained by interfacial polymerisation of vinyltriethoxy silane and at least one other ethylenically unsaturated monomer copolymerizable with vinyltriethoxy silane, the functionalized particles being capable to chemically bind to a substrate, are suitable as controlled release systems for textile applications to impart durable softness and excellent water retention even after multiple laundries.

20 Claims, No Drawings

FUNCTIONALIZED PARTICLES

This application is the National Phase of International Application PCT/EP2021/051445 filed Jan. 22, 2021 which designated the U.S. and which claims priority to IN 202011003976 filed Jan. 29, 2020. The noted applications are incorporated herein by reference.

The present invention relates to functionalized particles or capsules having a shell core configuration, wherein the polymeric shell comprises a matrix obtained by interfacial polymerisation of certain ethylenically unsaturated monomers. The particles may be used as microcontainers to encapsulate different substances or payloads. The particles have functional groups which are capable to permanently bind to the surface of substrates, such as textiles. This invention relates further to the preparation of the functionalized particles.

The technique of microencapsulation has achieved increasing importance, since this method enables substances of various states of aggregation to be enclosed. Microcapsules have been used as carriers for various payloads, such as, for example, inks and dyestuffs, odor or flavor substances, pharmaceutically active formulations, chemical reagents and plant protection agents.

Encapsulation of active compounds can be advantageous in reducing the odor nuisance in the case of odor-intensive active compounds. A further advantage of encapsulation is that it is thereby possible to achieve release of the active compound in a controlled manner with respect to time and amount (depot action). As a result of this "slow release" effect, the active compound can remain active over a longer period and can thereby be better utilized, the number of applications necessary can be decreased and hence, finally, the total amount of active compound to be applied can be reduced.

Numerous mechanical and chemical processes for manufacturing of the capsules have already been described and used, for example, J. E. Vandegaer, "Microencapsulation", Plenum-Press, New York-London; 1974. Preparation is suitably carried out by interfacial polymerization, wherein the monomers polymerise at the interface between a dispersed phase and a continuous phase to form a shell around the dispersed phase.

Recently, microcapsules containing active agents have been applied also in the textile industry. Microcapsules allow for example for fragrances and perfumes or antimicrobial substances to be encapsulated. Such agents are released and impart fragrance or an antimicrobial effect to the finished textile material in order to reduce or prevent malodors due to perspiration. Furthermore, textiles have been finished with microcapsules containing phase change materials for thermoregulation. In textile application it is desired that the effect imparted stays permanent. Accordingly, the microcapsules have to permanently bind to the textile and resist repeated washing cycles during usage of the apparel. Nanoparticles for the permanent treatment of textiles are described, for example, in U.S. Pat. No. 6,607,994.

Fabric softeners improve different properties of textile such as soft hand (supple, pliant, sleek and fluffy), smoothness, flexibility, drapability and pliability. Fabric softeners may be cationic, anionic or nonionic depending on the purposes of end uses. Generally, fabric softeners are based on silicones, paraffins and polyethylene. Nonionic and cationic silicone softeners are commercially adopted for research or industrial purposes, because it provides higher softness, special unique hand, high lubricity, good sewability, elastic resilience, crease recovery and abrasion resistance.

Different approaches were accomplished to impart softener durability on fabrics, such as the application of citric acid or polyurethane based resin along with silicone softener. However, incorporation of excessive resin led to hamper fabric softness so that resins were not commercially adopted for this purpose. Silane coupling agent were used with silicone softener to improve durability. However, this approach has not been proven commercially viable, because of higher product costs. Microencapsulation of softeners was suggested as a further approach to impart wash durability.

The present invention accordingly relates to functionalized particles comprising a shell and a core and a payload that is embedded or entrapped, wherein the shell matrix is obtained by interfacial polymerisation of vinyltriethoxy silane and at least one other ethylenically unsaturated monomer copolymerizable with vinyltriethoxy silane, said functionalized particles being capable to chemically bind to a substrate.

The term "payload" as used herein refers to any material, substance, compound, agent, active material, active substance, active compound or active agent that is embedded or entrapped by the functionalized particle and that may be released from the cage of the payload containing particle in a controlled and/or prolonged fashion.

As the payload there come into consideration, for example, vitamines, phase change materials, catalysts, enzymes, biocides, antimicrobials, insecticides, acaricides, fungicides, herbicides, pheromones, fragrances, flavorings, softeners, pharmaceutical active compounds, cosmetic actives, active compounds for antistatic finishing or flame retardant finishing, UV-stabilizers, dyestuffs, pigments or mixtures thereof.

The functionalized particles can be used, for example, to
release active compounds in a controlled manner,
increase the bioavailability of active compounds,
increase the durability of active compounds on textiles against laundering,
encapsulate phase change materials for textile application, such as semisynthetic glycerides.
stabilize active compounds, e.g. to light, temperature, oxidation, hydrolysis, evaporation by complex formation,
solubilize active compounds,
decrease toxicity or irritation of active compounds by encapsulation.

The polymeric shell matrix comprises functional groups that provide reactive radicals on the surface of the particle, which bind to groups attached to the substrate that are capable to chemically react with reactive radicals of the particle shell matrix to form covalent bonds between the particle and the substrate and permanently fix the particle to the substrate.

If the substrate is a textile fabric, the functional groups on the surface of the particles are selected from those groups that are reactive and will bind chemically to the textile fabric, such as to the hydroxyl groups of the cellulose based fabrics or the amine, carboxylate and thiol groups of wool or silk and other proteinaceous animal fibers. The reactive groups, for example, may contain epoxide groups or epoxide precursors, such as halohydrins. Epoxides can react with amines and hydroxyl groups. Also, methylolacrylamide may be copolymerized into the particle matrix, or monomers that are modified with anhydride groups, or alkoxy silanes that carry an ethylenically unsaturated group.

Textile fiber reactive radicals are well known in the art of fiber reactive dyes and described, for example, in Venkataraman "The Chemistry of Synthetic Dyes" Band 6, Seiten 1-209, Academic Press, New York, London 1972. WO 2006/013165 which is incorporated herein by reference describes suitable textile fiber reactive group precursors which come into consideration for the preparation of monomers carrying fiber reactive groups by reaction of a monomer precursor with the fiber reactive group precursor.

In a certain embodiment of the present invention the at least one other ethylenically unsaturated monomer is a hydrophobic monomer.

As hydrophobic monomers there are mentioned, for example, styrene, α-methyl styrene, glycidyl methacrylate, vinyl trimethoxysilane, methyl methacrylate, ethyl methacrylate, n-propyl methacrylate, n-butyl methacrylate, 3-(trimethoxysilyl)propyl acrylate, 3-(trimethoxysilyl)propyl methacrylate, N-(tert-butyl)acrylamide, N-(n-decyl) acrylamide, n-decyl methacrylate, N-dodecylmethacrylamide, 2-ethylhexyl acrylate, n-hexadecyl methacrylate, n-myristyl acrylate, N-(n-octadecyl)acrylamide, n-octadecyltriethoxysilane, tert-octylacrylate, stearyl acrylate, stearyl methacrylate, vinyl laurate or vinyl stearate, preferably styrene, glycidyl methacrylate, methyl methacrylate, ethyl methacrylate, 3-(trimethoxysilyl)propyl acrylate or 3-(trimethoxysilyl)propyl methacrylate.

In an interesting embodiment of the present invention the at least one other ethylenically unsaturated hydrophobic monomer is styrene or glycidyl methacrylate.

In another interesting embodiment of the present invention the at least one other ethylenically unsaturated hydrophobic monomer is styrene and glycidyl methacrylate.

In yet another interesting embodiment of the present invention the shell matrix is obtained by interfacial polymerisation of vinyltriethoxy silane and at least one other ethylenically unsaturated monomer copolymerizable with vinyltriethoxy silane and at least one hydrophilic monomer.

As hydrophilic monomers there are mentioned, for example, acrylamide, methacrylamide, N-methylmethacrylamide, N-methylolacrylamide, acrylic acid, methacrylic acid, N-vinyl pyrrolidone, N-acryloyltris(hydroxymethyl)-methylamine, bisacrylamidoacetic acid, glycerol monoacrylate, glycerol monomethacrylate, 4-hydroxybutyl methacrylate, 2-hydroxyethyl acrylate, 2-hydroxyethyl methacrylate, N-(2-hydroxypropyl)methacrylamide, N-methacryloyl tris (hydroxymethyl)methylamine, polyethylene glycol monomethacrylate, 2-sulfoethyl methacrylate or 1,1,1-trimethylolpropane monoallyl ether, preferably acrylic acid, methacrylic acid or N-vinyl-2-pyrrolidone.

In a special embodiment of the present invention the payload is a fabric softener, especially a silicone softener. Depending on the morphology silicone softeners might be hydrophilic or hydrophobic. Hydrophilic silicone softeners are used mostly in terry towel. However, these silicone softeners have very limited durability upon laundering.

The silicone softener may be a polysiloxane, which is a polymer comprising Si—O moieties. Suitable silicone softener may be selected from (a) non-functionalized siloxane polymers, (b) functionalized siloxane polymers, and combinations thereof. The functionalized siloxane polymers may comprise an aminosilicone, silicone polyether, polydimethyl siloxane, cationic silicones, silicone polyurethane, silicone polyureas, or mixtures thereof. The silicone softener may comprise a cyclic polysiloxane.

Suitable silicone softener may be linear, branched or cross-linked. The silicones may comprise silicone resins. Silicone resins are highly cross-linked polymeric siloxane systems. The cross-linking is introduced through the incorporation of trifunctional and tetrafunctional silanes with monofunctional or difunctional, or both, silanes during manufacture of the silicone resin.

The non-functionalized siloxane polymer may comprise polyalkyl and/or phenyl silicone fluids, resins and/or gums.

Functionalized siloxane polymers may comprise one or more functional moieties selected from the group consisting of amino, amido, alkoxy, hydroxy, polyether, carboxy, hydride, mercapto, sulfate phosphate, and/or quaternary ammonium moieties. These moieties may be attached directly to the siloxane backbone through a bivalent alkylene radical or may be part of the backbone. Suitable functionalized siloxane polymers include materials selected from the group consisting of aminosilicones, amidosilicones, silicone polyethers, silicone-urethane polymers, quaternary ABn silicones, amino ABn silicones, and combinations thereof.

The functionalized siloxane polymer may comprise a silicone polyether. In general, silicone polyethers comprise a polydimethylsiloxane backbone with one or more polyoxyalkylene chains. The polyoxyalkylene moieties may be incorporated in the polymer as pendent chains or as terminal blocks.

The functionalized siloxane polymer may comprise an aminosilicone, for example, a monoamine, a diamine, or mixtures thereof. The functional group may comprise a primary amine, a secondary amine, a tertiary amine, quaternized amines, or combinations thereof.

In a certain embodiment of the present invention the silicone softener is an aminosilicone or an amino-functionalized siloxane, wherein the amino group is attached to the siloxane backbone through a bivalent alkylene radical.

Fabric softener are commercially available, for example, from Huntsman Corporation under the tradename ULTRAPHIL® or ULTRATEX®.

The particles of the present invention are formed by contacting a payload with vinyltriethoxy silane monomer and at least one other ethylenically unsaturated monomer, so that the monomers assemble around the payload. The monomers are then polymerized to yield a polymeric shell matrix around the payload so that the polymeric shell matrix surrounds the payload or binds directly to the payload.

In a certain embodiment of the present invention, the payload is chemically bonded to the shell matrix of the functionalized particle. In case the payload is a functionalized silicone softener, the reactive radical of the particle shell matrix may react with the functional moiety of the silicone softener, for example, an amino group, to form a covalent bond between the silicone softener and the shell matrix.

Alternatively, a functionalized particle can first be prepared without the payload being present by polymerizing vinyltriethoxy silane and at least one other ethylenically unsaturated monomer to form the polymeric shell matrix, after which the particle thus formed is exposed to a payload under suitable conditions so that the payload is absorbed into and entrapped in the polymeric matrix.

Appropriately, the preparation of the functionalized particles of the present invention is accomplished by polymerization of the monomers in an oil-in-water dispersion. The payload is finally taken up into the interiors of the particles by including it in the hydrophobic oil-phase in advance. As required, the particles of this invention may contain plasticizers, paraffins, animal and vegetable oils, silicone oils and synthetic resins (e.g. xylene resins and ketone resins) so long as they are inert to the monomers.

In a typical embodiment of the preparation of the functionalized particles of the present invention, the payload along with an emulsifier is dispersed in water. If the payload is a solid or a highly viscous liquid, it is appropriately first dissolved in a suitable hydrophobic organic solvent that is immiscible in water. Upon applying high shear forces an emulsion of finely dispersed oil droplets in water is obtained comprising the payload. Afterwards the initiator is added to the oil-in-water emulsion at room temperature. Then, the monomers that include the functionalized monomers carrying reactive radicals are added to polymerize at an elevated temperature and form a polymer shell around the payload. The resulting particles contain the payload that is embedded or entrapped and carry reactive functional groups on its polymer surface capable of binding to a substrate to be treated, such as fibers of a textile or web.

The hydrophobic oil-phase containing to be dispersed in the aqueous phase may be reduced in viscosity by adding, as required, a non-reactive hydrophobic organic solvent. The amount of the organic solvent in this case is suitably not more than 80% by weight based on the weight of the entire hydrophobic phase. Examples of organic solvents that can be used include aromatic hydrocarbons; aliphatic hydrocarbons; esters, such as dimethylphtalate; ethers; and ketones. As required, these organic solvents may be removed by heating or pressure reduction during or after forming the polymer microparticles.

The aqueous phase in which the hydrophobic phase is to be dispersed may contain 0.1 to 20% by weight based on the aqueous phase of at least one protective colloid such as polyvinyl alcohol, hydroxyalkyl celluloses, carboxyalkyl celluloses, gum arabic, polyacrylates, polyacrylamides, polyvinylpyrrolidone and ethylene maleic anhydride copolymer. The aqueous phase may contain 0.1 to 10% by weight based on the aqueous phase of nonionic, anionic or cationic surface-active agents, such as, for example, Polysorbate 80.

The step of dispersing the hydrophobic phase in the aqueous phase is carried out at a temperature of from e.g. 5 to 90° C. to stabilize the dispersion. The dispersion may be carried out easily by a suitable dispersing device such as a high speed agitator, homogenizer, a homodisperser or a propellar-type general stirrer or by a customary action.

In many cases, it is preferred to stir the dispersion mildly by using a propellar-type stirrer after the end of the dispersing step.

The average particle size is dependent on the temperature and the agitation speed, whereby a high agitation speed and a high temperature favor a small particle size. Furthermore, average particle size can be controlled by the viscosity of the reaction medium. The viscosity may be adjusted by adding viscosity regulating agents or thickeners such as commercially available alginate thickeners, starch ethers or locust bean flour ethers, sodium alginate on its own or in admixture with modified cellulose, e.g. methylcellulose, ethylcellulose, carboxymethylcellulose, hydroxyethylcellulose, methylhydroxyethylcellulose, hydroxypropyl cellulose or hydroxypropyl methylcellulose, especially with preferably from 20 to 25% by weight carboxymethylcellulose. Synthetic thickeners that may be mentioned are, for example, those based on poly(meth)acrylic acids, poly(meth)acrylamides or polyvinyl pyrrolidones.

Dependent on their particle size the functionalized particles of the present invention are also referred to as microparticles or nano-particles.

Polymerization can be accomplished by procedures known in the art and is commonly accomplished by heat or by radiation, such as UV light or gamma rays. Catalysts or photo- or thermal-initiators are suitably used to prepare the functionalized particles of the present invention. Such initiators and catalysts are well known in the art and are commercially available. There are mentioned, in particular, radical polymerization initiators commercially available from Wako Pure Chemical Industries, such as 2,2'-azobis[2-(2-imidazolin-2 yl)propane]dihydrochloride (VA 044) or AIBN.

The polymerization initiator is used in an amount, for example, of from 0.05 to 1.0 wt %, preferably 0.1 to 0.5 wt % based on the total weight of the emulsion applied for preparation of the functionalized particles.

In case the payload is a functionalized silicone softener, the weight ratio of monomer to silicone softener is, for example, of from 1:10 to 10:1, preferably 1:4 to 4:1 and especially 2:1 to 1:2.

The resulting particles are used according to the respective purposes. They may be used in the form of a fine powder after drying them by a spray drying method, a concentric separating drying method, a filtration drying method or a fluidized bed drying method. Likewise, functionalized particles may be used as a dispersion in water.

In the functionalized particles of the invention so obtained, the reaction is sufficiently completed to such an extent that no appreciable trace of the unreacted monomer is seen in the interior. Accordingly, the particles are very tough and have excellent solvent resistance.

Accordingly, the present invention also relates to a process for the preparation of the functionalized particles according to the present invention, which process comprises the steps of preparing an oil-in-water dispersion and causing polymerisation of vinyltriethoxy silane and at least one other ethylenically unsaturated monomer copolymerizable with vinyltriethoxy silane at the oil-water interface in the presence of the payload, wherein the variables are as defined and preferred above.

The functionalized particles according to the present invention react with various compounds or substrates which contain nucleophilic groups, e.g. —OH, —NH or —SH, with their reactive radicals attached to their outer shell. The reactive radicals form covalent bonds at room temperature or elevated temperatures of from, for example, 0 to 230° C., preferably 20 to 80° C. in wet applications and 120 to 180° C. in dry applications, which may be accomplished in the presence of e.g. alkali, such as soda, sodium hydroxide or potassium hydroxide, as it is known in the art of textile dyeing or printing with reactive dyestuffs.

Accordingly, the present invention relates also to a process for the preparation of a substrate modified with the functionalized particles, comprising treating the said substrate with the functionalized particles according to the present invention or the functionalized particles prepared in accordance with the present invention, so that the functionalized particles chemically bind to the substrate, wherein the variables are as defined and preferred above.

Preferred as the substrates are fiber materials containing hydroxyl groups or containing nitrogen, such as textile fiber materials, keratineous fibers, e.g. human hair, or paper, preferably textile fiber materials. Textile fiber materials can be in the form of fiber, yarn or piece goods, such as non-wovens, knitted and woven goods, pile fabrics or terry goods. Examples are silk, wool, polyamide fibers and polyurethanes, and preferably all types of cellulosic fiber materials. Such cellulose fiber materials are, for example, the natural cellulosic fibers, such as cotton, linen and hemp, as well as cellulose and regenerated cellulose. The functionalized microparticles according to the invention are also suitable for finishing fibers containing hydroxyl groups which are contained in blend fabrics, for example mixtures of cotton with polyester fibers or polyamide fibers. The functionalized particles according to the invention are particularly suitable for finishing cellulose containing textile fiber materials, such as cotton containing textile fiber materials. They can furthermore be used for finishing natural or synthetic polyamide fiber materials.

The functionalized microparticles according to the present invention are applied to the textile goods in aqueous solution, in analogy to the dyeing processes known for reactive dyes or finishing processes in textile industry. They are suitable for spray-, exhaust- and for the pad-method, in which the goods are impregnated with aqueous solutions, which may contain salts. Dyeing machines customary in dyeing with reactive dyes are preferably utilized for this. The functionalized microparticles according to the present invention are fixed, if appropriate after an alkali treatment under the action of heat, steam or by storage at room temperature for several hours, thereby forming a chemical bond with the substrate. The functionalized particles according to the present invention can also be applied in the presence of crosslinking agents or resin finish, for example, dimethylol-urea, dimethoxy-methyl-urea, trimethoxy-methyl-melamin, tetramethoxy-methyl-melamine, hexamethoxy-methyl-melamine, dimethylol-dihydroxy-ethylene-urea, dimethylol-propylene-urea, dimethylol-4-methoxy-5, 5'-dimethyl-propylene-urea, dimethylol-5-hydroxypropylene-urea, butane-tetra-carboxylic-acid, citric acid, maleic acid, bonding agents, for example, acrylates, silicones, urethanes, butadienes, in a textile finishing process which may result in superior effect durability. Such textile finishing processes are described, for example, in DE-A-40 35 378. After the fixing, the finished substrates are rinsed thoroughly with cold and hot water, if appropriate with the addition of an agent which has a dispersing action and promotes diffusion of the non-fixed portions.

The finished substrates contain, for example, 0.1 to 25% by weight, preferably 1 to 10% by weight, of the functionalized microparticles according to the present invention, based on the total weight of the substrate.

The textile fabrics finished with the silicone softener containing functionalized particles of the present invention are distinguished by their durable softness and excellent water retention. Therefore, the silicone softener containing functionalized particles of the present invention are in particular suitable for the durable finishing of terry towels to impart softness and excellent handle even after multiple laundries and maintaining at the same time a high degree of water retention.

The following Examples illustrate the present invention. Parts and percentages are by weight unless otherwise specified.

PREPARATION EXAMPLE 1

64.3 g of a suitable silicone softener (containing 30.89 gm of active silicone content), 0.64 g polysorbate 80 and 25 g of deionized water are added to a 3 neck-glass reactor equipped with a condenser, a thermometer an agitator and a dropping funnel. The mixture is stirred at 350 rpm for 10 to 15 minutes and nitrogen is purged through the mixture. Then 0.42 g of 2,2'-azobis[2-(2-imidazolin-2-yl) propane] dihydrochloride are added to the mixture under stirring at room temperature. The temperature of the mixture is slowly raised to 35 to 40° C. within 10 to 15 minutes and maintained at this temperature. Subsequently, 1.55 g of vinyl triethoxysilane, 1.55 g of glycidyl methacrylate and 5.79 g of styrene are added to the reaction mixture at 35 to 40° C. under stirring. After the addition of the monomers is completed the temperature of the reaction mixture is increased to 50 to 55° C. and stirring is continued for 4 h under a nitrogen atmosphere. Afterwards the reaction mixture is allowed to cool to 25 to 35° C. The concentration of unreacted monomer is verified by GC and HPLC. The content of residual unreacted styrene is below 0.09%. Afterwards water is added to adjust the desired solid content of 35 to 38%. The dispersion of the functionalized particles thus obtained shows a good shelf life even upon prolonged storage at 40° C.

APPLICATION EXAMPLE 1

A cotton fabric/towel is passed through padding mangle to wet the fabric/towel with water. Subsequently, the wet fabric/towel is passed through 1-liter application bath prepared using 50 g of encapsulated silicone softener obtained in accordance with Preparation Example 1 and 10 g of UVITEX® BST LIQ. The pH of application bath is adjusted to 5.5 using acetic acid. The pick-up of the cotton fabric/towel is 15±2%. The treated wet cotton fabric/towel is dried and cured at 120±5° C. for 10 minutes. After drying and curing the fabric is tumble dried for 20 minutes with hot air of a temperature of 45° C. The fabric/towel thus treated is kept for conditioning at 25±5° C. for 1 day.

The treated fabric/towels are tested for initial and 10 Home Laundering (HL). Washing is done as per European 7A Home Laundering method. Initial softness, softness upon washing and water retention of treated towel are recorded after conditioning. Water retention in % is determined according to ASTMD 4772. An untreated fabric/terry towel ideally has a water retention of about 70%.

The fabric/towel treated in accordance with Application Example 1 shows a good softness/handle even after 10 home laundries and an initial water retention of 55±5%.

Examples 2 to 6 (Preparation and Application)

Following a procedure analogous to that described in Example 1, but using the monomers given in Table 1 there are obtained the functionalized particles of Examples 2 to 6 with the properties given in Table 1.

TABLE 1

| | Monomer concentration [wt %] | | | | | | Shelf life at 40° C. | Water retention [%] | Handle after 10 HL |
|---|---|---|---|---|---|---|---|---|---|
| Ex | Styrene | Vinyltriethoxy silane | Glycidyl meth-acrylate | Vinyl pyrrolidone | Monomer/silicone ratio | Initiator [wt %]** | | | |
| 2 | 9.3 | 4.68 | 4.68 | | 1:2 | 0.9 | yes | 12 | yes |
| 3 | 5 | 2.5 | 1 | | 1:2 | 0.5 | yes | 30 | yes |
| 4 | 5 | 2.5 | 1 | 1 | 1:2.3 | 0.5 | yes | 10 | yes |

TABLE 1-continued

| | Monomer concentration [wt %] | | | | | Shelf | | |
|---|---|---|---|---|---|---|---|---|
| Ex | Styrene | Vinyltriethoxy silane | Glycidyl methacrylate | Vinyl pyrrolidone | Monomer/ silicone ratio | Initiator [wt %]** | life at 40° C. | Water retention [%] | Handle after 10 HL |
| 5 | 7.5 | 2 | 2 | | 1.6:1 | 0.5 | yes | 48 | yes |
| 6* | 7.4 | 1.96 | 1.96 | | 1.5:1 | 0.5 | yes | 46 | yes |

*Example 6 contains in addition to the other monomers 1 wt % of acrylic acid and 0.01 wt % of 3-(trimethoxysilyl)propyl methacrylate.
**[wt %] is based on the total weight of the emulsion applied for preparation of the functionalized particles.

The fabric/towels treated in accordance with Examples 2 to 6 show a good softness/handle even after 10 home laundries and a good water retention.

What is claimed is:

1. Functionalized particles comprising a shell and a core and a payload that is embedded or entrapped, wherein the shell comprises a matrix obtained by interfacial polymerisation of ethylenically unsaturated monomers comprising vinyltriethoxy silane and styrene, wherein a majority of the ethylenically unsaturated monomers by weight comprises styrene, said functionalized particles being capable to chemically bind to a substrate, wherein the payload is a particle or water insoluble droplet.

2. Functionalized particles according to claim 1, comprising at least one other ethylenically unsaturated monomer, wherein the at least one other ethylenically unsaturated monomer is a hydrophobic monomer.

3. Functionalized particles according to claim 2, wherein the hydrophobic monomer is glycidyl methacrylate.

4. Functionalized particles according to claim 1, wherein the payload is a silicone softener.

5. Functionalized particles according to claim 1, wherein the payload is chemically bonded to the matrix of the functionalized particle.

6. A process for the preparation of the functionalized particles according to claim 1, which process comprises the steps of preparing an oil-in-water dispersion and causing polymerisation of vinyltriethoxy silane, styrene and at least one other ethylenically unsaturated monomer copolymerizable with vinyltriethoxy silane at an oil-water interface in the presence of the payload.

7. A process for the preparation of a substrate modified with functionalized particles, comprising treating the substrate with the functionalized particles according to claim 1 to chemically bind the functionalized particles to the substrate.

8. The process according to claim 7, wherein the substrate is a fiber material containing hydroxyl groups or nitrogen-containing groups.

9. The process according to claim 8, wherein the fiber material is cellulose containing textile fiber material.

10. A substrate modified with functionalized particles obtained according to the process of claim 7.

11. Functionalized particles according to claim 1, wherein the functionalized particles comprise epoxide groups or epoxide precursors for chemically binding to a substrate.

12. Functionalized particles according to claim 1, wherein the payload is a polysiloxane.

13. Functionalized particles according to claim 1, wherein the payload is a functionalized siloxane polymer selected from the group consisting of aminosilicones, amidosilicones, silicone polyethers, silicone-urethane polymers, quaternary ABn silicones, amino ABn silicones, and combinations thereof.

14. Functionalized particles according to claim 1, wherein the payload is a silicone softener chemically bonded to the matrix of the functionalized particle.

15. Functionalized particles comprising a polymeric shell and a polysiloxane that is embedded or entrapped, wherein the polymeric shell is obtained by polymerization of ethylenically unsaturated monomers comprising vinyltriethoxy silane, styrene and glycidyl methacrylate, wherein a majority of the ethylenically unsaturated monomers comprises styrene, and wherein the polymeric shell is capable of being covalently bound to a substrate comprising —OH, —NH or —SH groups.

16. Functionalized particles according to claim 15, wherein the polymeric shell comprises epoxide groups or epoxide precursor groups on an outer surface thereof.

17. Functionalized particles according to claim 15, wherein the polysiloxane is covalently bonded to the polymeric shell.

18. A modified textile comprising functionalized particles and a textile, the functionalized particles comprising a polymeric shell and a silicone softener that is embedded or entrapped, wherein the shell is obtained by polymerization of ethylenically unsaturated monomers comprising vinyltriethoxy silane, styrene and glycidyl methacrylate, wherein a majority of the ethylenically unsaturated monomers comprises styrene, and wherein the polymeric shell is covalently bonded to the textile.

19. The modified textile of claim 18, wherein the silicone softener comprises a polysiloxane covalently bonded to the polymeric shell.

20. The modified textile of claim 18, wherein the textile comprises a cellulose based fabric, wool or silk.

* * * * *